United States Patent [19]

Murata

[11] Patent Number: 5,517,396
[45] Date of Patent: May 14, 1996

[54] POWER SUPPLY APPARATUS HAVING AC-DC CONVERTER

[75] Inventor: Satoshi Murata, Gunma, Japan

[73] Assignee: NEC Corporation, Tokyo, Japan

[21] Appl. No.: 243,914

[22] Filed: May 17, 1994

[30] Foreign Application Priority Data

May 17, 1993 [JP] Japan ................... 5-113520

[51] Int. Cl.⁶ .................. H02M 3/00; H02H 3/18
[52] U.S. Cl. ....................... 363/15; 361/79
[58] Field of Search .................. 363/15, 16, 49, 363/100, 123, 131; 323/220, 222; 361/54, 57, 79–84, 89, 100; 364/492, 493

[56] References Cited

U.S. PATENT DOCUMENTS

| | | | |
|---|---|---|---|
| 4,722,024 | 1/1988 | Fisenberg et al. | 361/100 |
| 4,803,592 | 2/1989 | Ashley | 361/79 |
| 5,341,279 | 8/1994 | Yamada | 363/15 |
| 5,349,523 | 9/1994 | Inov et al. | 363/97 |
| 5,350,997 | 9/1994 | Ghotbi et al. | 323/222 |

*Primary Examiner*—Peter S. Wong
*Assistant Examiner*—Matthew V. Nguyen
*Attorney, Agent, or Firm*—Foley & Lardner

[57] ABSTRACT

A power supply apparatus having an AC-DC converter includes a transformer, an AC-DC converter, a power supply controller, a push switch, and a relay and a relay contact. The relay is connected to an AC power supply voltage input side of the primary coil of the transformer, turned on to apply the AC power supply voltage to the primary coil of the transformer when the push switch designates to start applying the DC power supply voltage to the load, and turned off to stop applying the AC power supply voltage to the primary coil of the transformer when the push switch designates to stop applying the DC power supply voltage to the load.

6 Claims, 4 Drawing Sheets

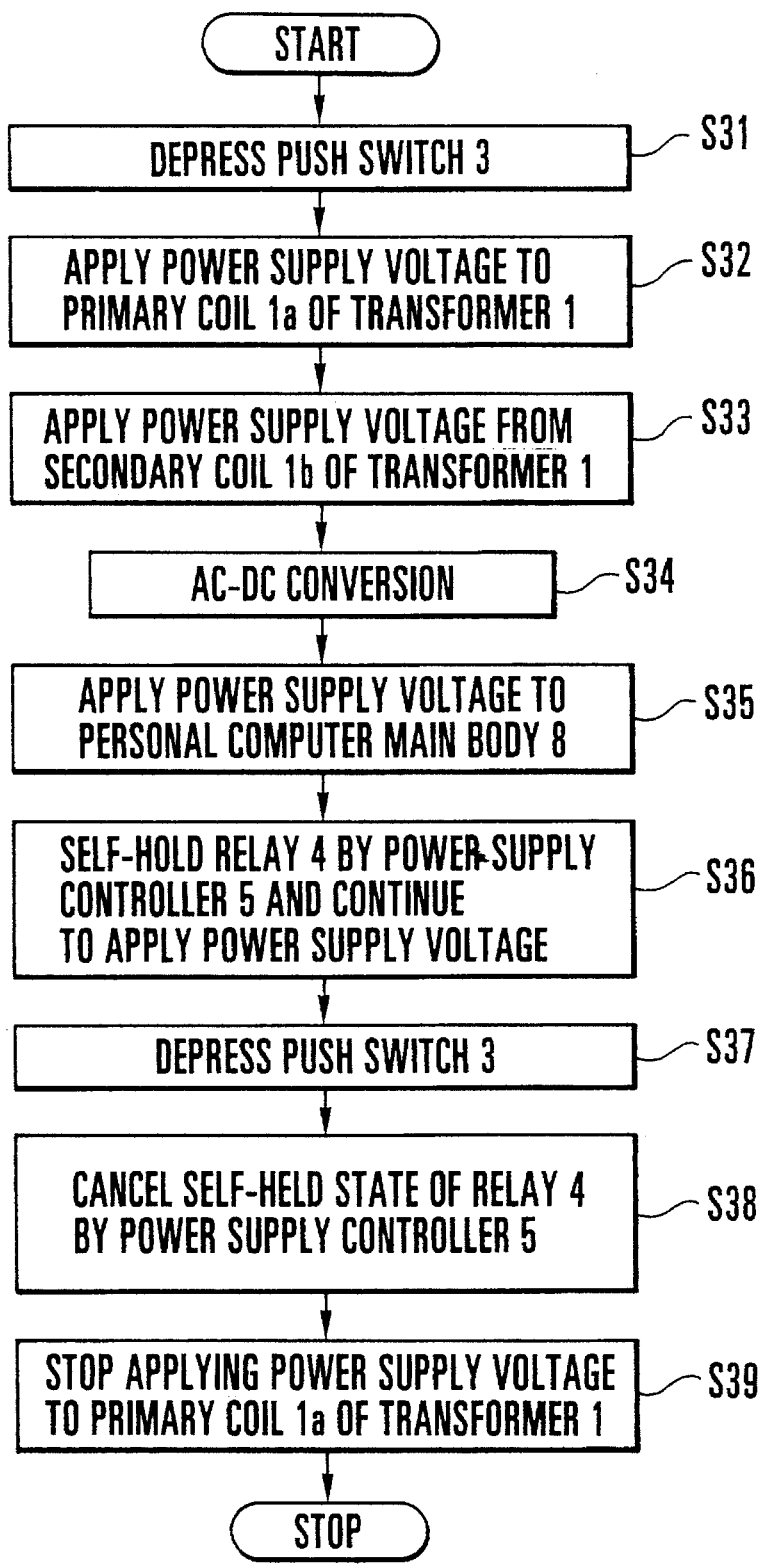
F I G. 3

POWER SUPPLY APPARATUS HAVING AC-DC CONVERTER

BACKGROUND OF THE INVENTION

The present invention relates to a power supply apparatus having an AC-DC converter and, more particularly, to a power supply apparatus for receiving an AC power supply voltage to apply a DC power supply voltage to office automation equipment such as a personal computer main body.

FIG. 4 shows a conventional power supply apparatus of a personal computer.

The conventional power supply apparatus of a personal computer for receiving an AC (alternating current) power supply voltage to apply a DC (direct current) power supply voltage to the personal computer main body comprises a transformer 11, an AC-DC converter 12, a power supply controller 15, and a push switch 13. The transformer 11 transforms the AC power supply voltage which is applied from input terminals 16a and 16b to a primary coil 11a and outputs the transformed voltage from a secondary coil 11b. The AC-DC converter 12 converts the AC power supply voltage applied from the secondary coil 11b of the transformer 11 into a DC power supply voltage. The power supply controller 15 performs control for applying the DC power supply voltage applied from the AC-DC converter 12 to a personal computer main body 18 through output terminals 17a and 17b. The push switch 13 outputs a control signal to the power supply controller 15 to perform an ON/OFF operation of the DC power supply voltage which is applied from the power supply controller 15 to the personal computer main body 18.

With this arrangement, the power supply apparatus of the personal computer operates as follows.

A commercial AC power supply voltage of 100 V is input from the input terminals 16a and 16b to the primary coil 11a of the transformer 11. At this time, an AC power supply voltage corresponding to the turn ratio of the primary coil 11a to the secondary coil 11b is generated in the secondary coil 11b and output. The AC-DC converter 12 converts the AC power supply voltage applied from the secondary coil 11b of the transformer 11 into a DC power supply voltage. The DC power supply voltage converted by the AC-DC converter 12 is input to the power supply controller 15. Upon reception of a control signal which is output when the push switch 13 is depressed and grounded, the DC power supply voltage received by the power supply controller 15 is applied to the personal computer main body 18 through the output terminals 17a and 17b. The power supply controller 15 continues to apply the DC power supply voltage until the restored push switch 13 is depressed again. When the push switch 13 is depressed again, application of the DC power supply voltage to the personal computer main body 18 is immediately stopped.

In the conventional power supply apparatus of the personal computer as described above, no switching circuit is provided to the primary coil 11a of the transformer 11. Therefore, even when no DC power supply voltage is applied to the personal computer main body 18, some power supply voltage is applied to the AC-DC converter 12 and the power supply controller 15. For this reason, the AC-DC converter 12 and the power supply controller 15 waste the power, and heat and a fault wave are also generated.

SUMMARY OF THE INVENTION

It is an object of the present invention to provide a power supply apparatus for preventing wasteful power consumption.

It is another object of the present invention to provide a power supply apparatus for preventing generation of heat and a fault wave when no power supply voltage is applied to a load.

In order to achieve the above objects of the present invention, there is provided a power supply apparatus having an AC-DC converter, comprising a transformer for transforming an AC power supply voltage input to a primary coil into an AC power supply voltage having a predetermined level and outputting the transformed voltage from a secondary coil, an AC-DC converter for converting the AC power supply voltage output from the transformer into a DC power supply voltage, power supply control means for performing output control of the DC power supply voltage from the AC-DC converter to a load, first switching means for designating the power supply control means to start or stop applying the DC power supply voltage to the load and at the same time applying the AC power supply voltage to the primary coil of the transformer during an operation, and second switching means connected to an AC power supply voltage input side of the primary coil of the transformer, turned on to apply the AC power supply voltage to the primary coil of the transformer when the first switching means designates to start applying the DC power supply voltage to the load, and turned off to stop applying the AC power supply voltage to the primary coil of the transformer when the first switching means designates to stop applying the DC power supply voltage to the load.

BRIEF DESCRIPTION OF THE DRAWINGS

FIG. 3 is a flow chart showing an operation of the power supply apparatus in FIG. 1.

DESCRIPTION OF THE PREFERRED EMBODIMENT

An embodiment of the present invention will be described below with reference to the accompanying drawings.

Figure 1:
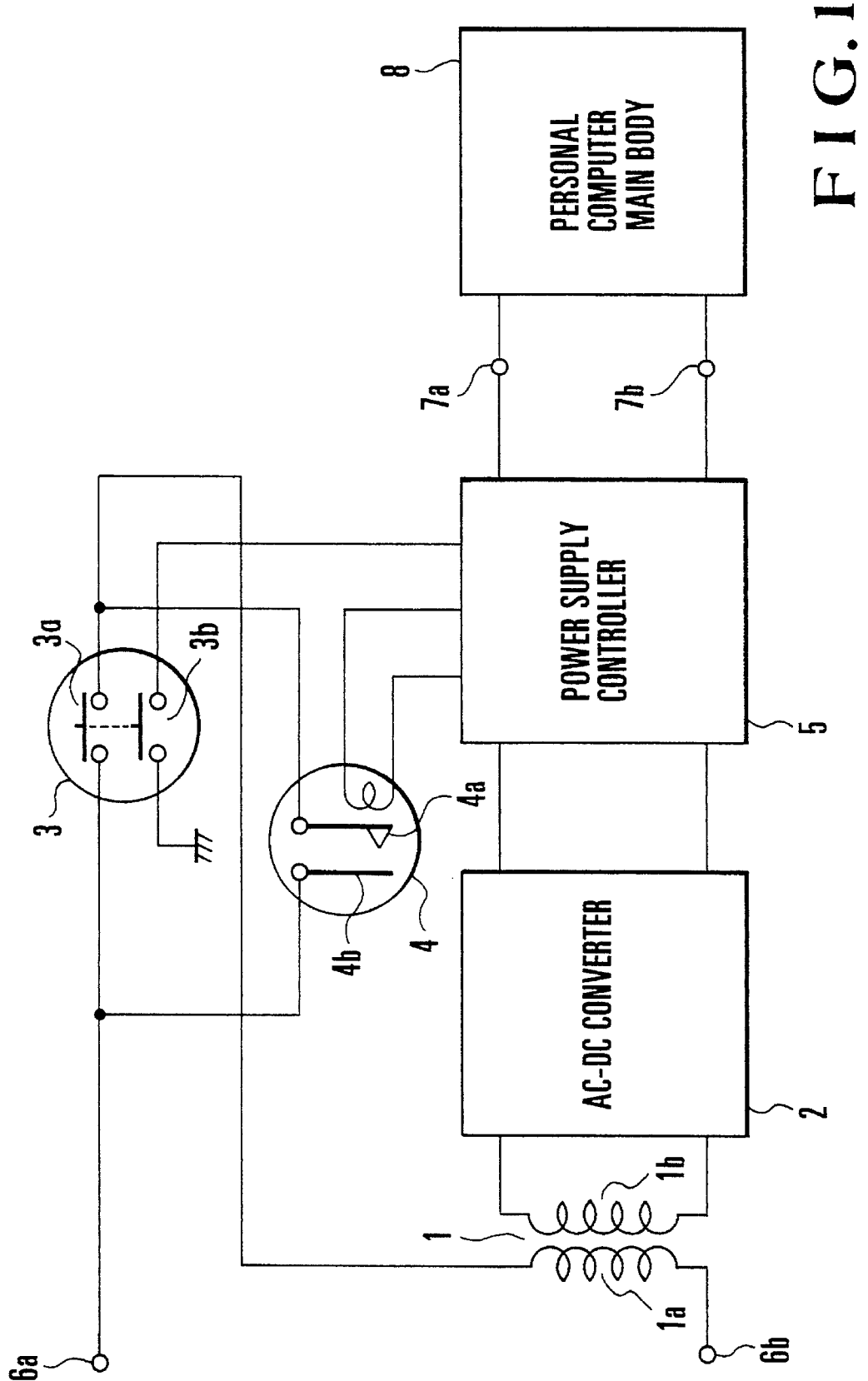
FIG. 1 is a block diagram showing a power supply apparatus according to an embodiment of the present invention.

FIG. 1 shows a power supply apparatus according to an embodiment of the present invention.

Referring to FIG. 1, a transformer 1 inputs a commercial AC power supply voltage of 100 V from input terminals 6a and 6b to a primary coil 1a and transforms and applies the voltage from a secondary coil 1b to an AC-DC converter 2. The AC-DC converter 2 converts the AC power supply voltage applied from the secondary coil 1b of the transformer 1 into a DC power supply voltage and applies the resultant voltage to a power supply controller 5. The power supply controller 5 performs control for applying the DC power supply voltage applied from the AC-DC converter 2 to a personal computer main body 8 through output terminals 7a and 7b.

Figure 4:
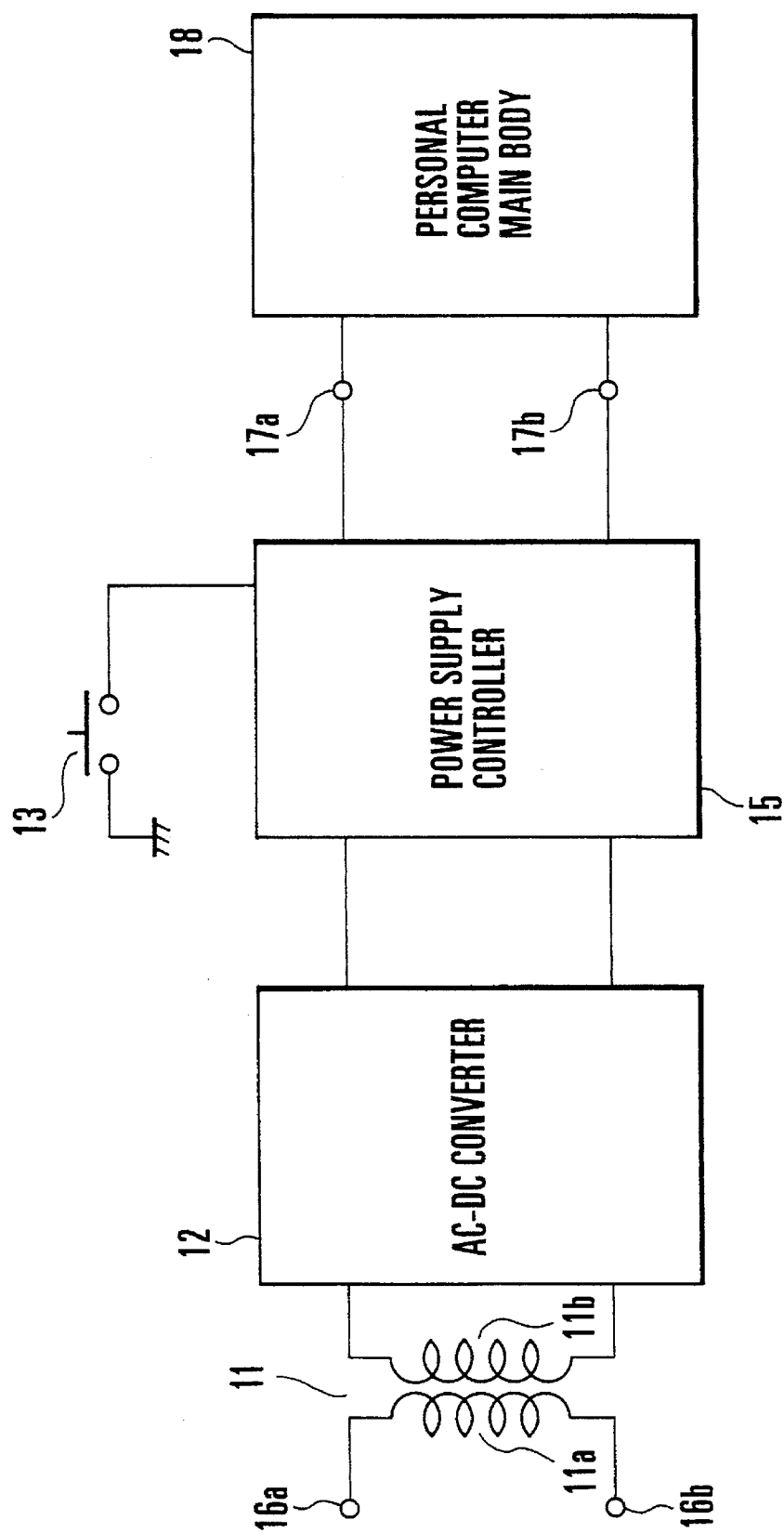
FIG. 4 is a block diagram showing a conventional power supply apparatus of a personal computer.

In the input circuit of the primary coil 1a of the transformer 1, a switching circuit constituted by a contact 3a of a push switch 3 and a contact 4b of a relay 4, both of which are connected in parallel to each other, is connected in series with the input terminal 6a. With this switching circuit, the power supply to the primary coil 1a of the transformer 1 can be turned on/off. A coil 4a of the relay 4 is connected to the power supply controller 5. The push switch 3 also has a function of outputting a control signal to the power supply controller 5 by a contact 3b to perform an ON/OFF operation of the DC power supply voltage which is applied from the power supply controller 5 to the personal computer main body 8, as in the prior art in FIG. 4.

Figure 2:
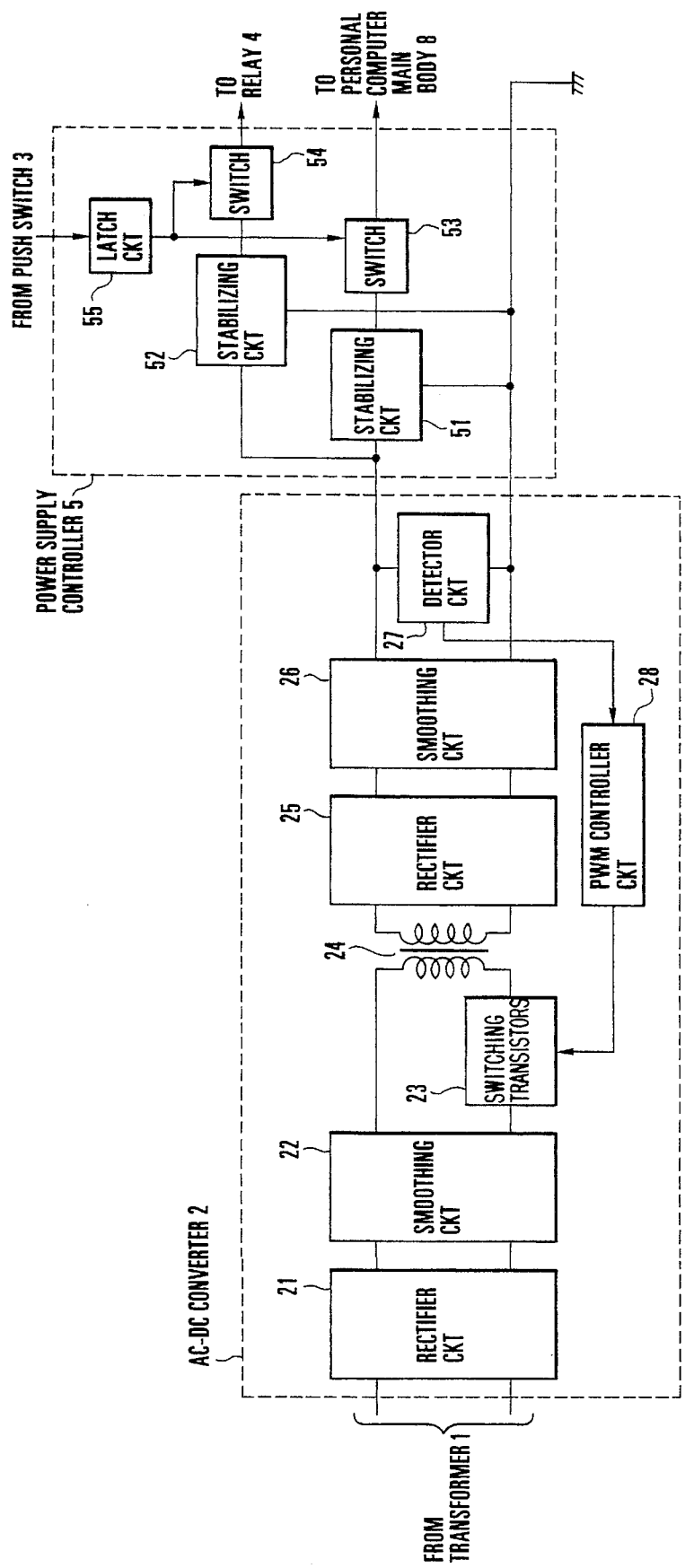
FIG. 2 is a block diagram showing an AC-DC converter and a power supply controller in FIG. 1.

FIG. 2 shows the AC-DC converter 2 and the power supply controller 5 in FIG. 1 in detail. The AC-DC converter 2 is constituted by a rectifier 21 for rectifying the AC power supply voltage from the transformer 1 into a DC power supply voltage, a smoothing circuit 22 for smoothing the DC power supply voltage from the rectifier 21, a switching transistor 23 for converting the DC power supply voltage from the smoothing circuit 22 into a high-frequency AC voltage signal, a transformer 24 for stepping up/down the AC voltage signal generated by the switching operation of the switching transistor 23 to a predetermined voltage level, a rectifier 25 for rectifying the AC power supply voltage generated on the secondary side of the transformer 24 into a DC power supply voltage, a smoothing circuit 26 for smoothing the DC power supply voltage from the rectifier 25, a detector 27 for detecting the level of the DC power supply voltage output from the smoothing circuit 26, and a PWM (Pulse Width Modulation) controller 28 for controlling the operation time of the switching transistor 23 on the basis of the detection output from the detector 27 to obtain a predetermined DC voltage from the smoothing circuit 26 at a predetermined level.

The power supply controller 5 is constituted by stabilizing circuits 51 and 52 for stabilizing the conversion output from the AC-DC converter 2, i.e., the DC power supply voltage from the smoothing circuit 26 to a predetermined DC power supply voltage, a switch 53 for outputting the stabilized DC voltage from the stabilizing circuit 51 to the personal computer main body 8 by an ON operation, a switch 54 for outputting the stabilized DC voltage from the stabilizing circuit 52 to the coil 4a of the relay 4 by an ON operation, and a latch circuit 55 for holding a control signal received from the contact 3b of the push switch 3 to control the operations of the switches 53 and 54. Upon reception of a control signal, the latch circuit 55 inverted to repeatedly hold and reset the control signal, thereby performing common control to the ON operations of the switches 53 and 54 by outputting the held control signal. The switches 53 and 54 are individually arranged on the output sides of the stabilizing circuits 51 and 52. However, one switch may be commonly arranged on the input side of the power supply controller 5.

An operation of the power supply apparatus having the above arrangement will be described with reference to the flow chart in FIG. 3.

The push switch 3 is depressed when no DC power supply voltage is applied to the microcomputer main body 8 (step S31). The input terminal 6a is connected to the primary coil 1a of the transformer 1 through the contact 3a, and an AC power supply voltage of 100 V is applied to the primary coil 1a of the transformer 1 (step S32). An AC power supply voltage corresponding to the turn ratio of the primary coil 1a to the secondary coil 1b is generated in the secondary coil 1b of the transformer 1 and output (step S33). The AC-DC converter 2 converts the AC power supply voltage applied from the secondary coil 1b of the transformer 1 into a DC power supply voltage (step S34). The power supply controller 5 receives the DC power supply voltage from the AC-DC converter 2. At this time, since the push switch 3 has been depressed to close the contact 3b, and the signal line for performing the ON/OFF operation of the power supply has been grounded, the switch 53 is turned on to apply the DC power supply voltage to the personal computer main body 8 through the output terminals 7a and 7b (step S35). At the same time, the power supply controller 5 supplies a current to the coil 4a of the relay 4 through the switch 54. With this operation, the contact 4b of the relay 4 is closed to directly apply the AC power supply voltage of 100 V from the input terminal 6a to the primary coil 1a of the transformer 1. That is, the relay 4 is self-held by the contact 4b, and the power supply voltage continues to be applied from the power supply controller 5 regardless of restoration of the push switch 3 (step S36).

Until the push switch 3 is depressed again, the power supply controller 5 continues to apply the DC power supply voltage to the personal computer main body 8. The current also continues to be supplied to the coil 4a of the relay 4, and the contact 4b is kept closed.

In this state, when the push switch 3 is depressed again (step S37), the power supply controller 5 turns the switch 53 off in accordance with a control signal from the contact 3b to stop applying the DC power supply voltage to the personal computer main body 8. At the same time, the power supply controller 5 also turns the switch 54 off to stop supplying the current to the coil 4a of the relay 4, thereby canceling self-held state of the relay 4 (step S38). With these operations, the contact 4b of the relay 4 is released. When the contact 3a is released by restoration of the push switch 3, application of the AC power supply voltage of 100 V to the primary coil 1a of the transformer 1 is stopped (step S39).

As has been described above, a switching circuit is provided in the power supply apparatus of the present invention such that when the power supply controller is designated by the push switch to start to apply a DC power supply voltage to a load such as a personal computer main body, an AC power supply voltage is applied to the primary coil of the transformer, and when the power supply controller is designated by the push switch to stop applying the DC power supply voltage to the load, application of the AC power supply voltage to the primary coil of the transformer is stopped. With this switching circuit, when no DC power supply voltage is applied to the load main body, application of the power supply voltage to the AC-DC converter and the power supply controller can be stopped. Therefore, wasteful power consumption can be eliminated, and generation of heat and a fault wave can be prevented.

What is claimed is:

1. A power supply apparatus having an AC-DC converter, comprising:

a transformer for transforming a first AC power supply voltage input to a primary coil into a second Ac power supply voltage having a predetermined level and outputting the second AC power supply voltage from a secondary coil;

an AC-DC converter for converting the second AC power supply voltage output from said transformer into a DC power supply voltage;

power supply control means for performing output control of the DC power supply voltage from said AC-DC converter to a load;

first switching means for designating said power supply control means to start or stop applying the DC power supply voltage to said load and at the same time applying the first AC power supply voltage to said primary coil of said transformer during an operation, wherein said first switching means includes a first contact for outputting a control signal to designate said power supply control means to apply the DC power supply voltage and a second contact connected to said primary coil of said transformer and operated in synchronism with said first contact; and second switching means for applying the first AC power supply voltage to said primary coil of said transformer, wherein said second switching means is turned on to apply the first AC power supply voltage to said primary coil of said transformer when said first switching means designates to start applying the DC power supply voltage to said load, and turned off to stop applying the first AC power supply voltage to said primary coil of said transformer when said first switching means designates to stop applying the DC power supply voltage to said load, and wherein said second switching means includes a relay having a relay contact and a relay coil, said relay contact being connected in parallel with said second contact of said first switching means, and said relay being driven and held by said power supply control means during application of the DC power supply voltage to said load and said relay coil.

2. An apparatus according to claim 1, wherein said first switching means comprises a push switch for turning on said first and second contacts in synchronization by a depressing operation and alternately repeating designation to start and stop applying the DC power supply voltage to said load for every depressing operation.

3. An apparatus according to claim 1, wherein said power supply control means comprises driving means for supplying a driving current to said relay to hold an operation of said relay during application of the DC power supply voltage to said load on the basis of designation from said first switching means to start applying the DC power supply voltage to said load and for stopping application of the driving current to said relay on the basis of designation from said first switching means to stop applying the DC power supply voltage to said load.

4. An apparatus according to claim 1, wherein the power supply control means comprises:

a first stabilizing circuit coupled to said AC-DC converter and configured to receive said DC power supply voltage and to provide a first stabilized DC voltage;

a second stabilizing circuit coupled to said AC-DC converter and configured to receive said DC power supply voltage and to provide a second stabilized DC voltage;

a latch circuit responsive to said control signal and configured to provide a switch signal;

a first switch circuit coupled to said latch circuit and said first stabilizing circuit, wherein said first switch circuit is responsive to said switch signal to selectively supply said first stabilized DC voltage to said load; and a second switch circuit coupled to said latch circuit and said second stabilizing circuit, wherein said second switch circuit is responsive to said switch signal to selectively supply said second stabilized DC voltage to said relay coil.

5. A power supply apparatus having an AC-DC converter, comprising:

a transformer for transforming a first AC power supply voltage input to a primary coil into a second AC power supply voltage having a predetermined level and outputting the second AC power supply voltage from a secondary coil;

an AC-DC converter for converting the second AC power supply voltage output from said transformer into a DC power supply voltage;

power supply control means for performing output control of the DC power supply voltage from said AC-DC converter to a load;

a push switch having a first contact for outputting a control signal to designate said power supply control means to start or stop applying the DC power supply voltage to said load and a second contact for applying said first AC power supply voltage to said primary coil of said transformer, said push switch operating on said first and second contacts in synchronization by a depressing operation and alternately repeating designation to start and stop applying the DC power supply voltage to said load for every depressing operation; and a relay for applying the first AC power supply voltage to said primary coil of said transformer, said relay having a relay contact and a relay coil, said relay contact being connected in parallel with said second contact of said push switch, wherein said power supply control means includes driving means for applying a driving current to said relay coil to hold an operation of said relay during application of the DC power supply voltage to said load on the basis of designation from said push switch to start applying the DC power supply voltage to said load and for stopping application of the driving current to said relay on the basis of designation from said push switch to stop applying the DC voltage to said load.

6. An apparatus according to claim 5, wherein the power supply control means comprises:

a first stabilizing circuit coupled to said AC-DC converter and configured to receive said DC power supply voltage and to provide a first stabilized DC voltage;

a second stabilizing circuit coupled to said AC-DC converter and configured to receive said DC power supply voltage and to provide a second stabilized DC voltage;

a latch circuit responsive to said control signal and configured to provide a switch signal;

a first switch circuit coupled to said latch circuit and said first stabilizing circuit, wherein said first switch circuit is responsive to said switch signal to selectively supply said first stabilized DC voltage to said load; and a second switch circuit coupled to said latch circuit and said second stabilizing circuit, wherein said second switch circuit is responsive to said switch signal to selectively apply said driving current to said relay coil.

* * * * *